United States Patent
Janac

(10) Patent No.: US 9,852,254 B2
(45) Date of Patent: Dec. 26, 2017

(54) AUTOMATIC ARCHITECTURE PLACEMENT GUIDANCE

(71) Applicant: Arteris, Inc., Campbell, CA (US)

(72) Inventor: Jiri George Janac, Saratoga, CA (US)

(73) Assignee: ARTERIS, Inc., Campbell, CA (US)

( * ) Notice: Subject to any disclaimer, the term of this patent is extended or adjusted under 35 U.S.C. 154(b) by 0 days.

(21) Appl. No.: 14/937,547

(22) Filed: Nov. 10, 2015

(65) Prior Publication Data
US 2017/0132350 A1  May 11, 2017

(51) Int. Cl.
*G06F 17/50* (2006.01)

(52) U.S. Cl.
CPC ........ *G06F 17/5072* (2013.01); *G06F 17/505* (2013.01)

(58) Field of Classification Search
CPC ............... G06F 17/5045; G06F 17/505; G06F 17/5068; G06F 17/5072; G06F 17/5077; G06F 17/5081; G06F 2217/06
USPC .................................................. 716/104, 118
See application file for complete search history.

(56) References Cited

U.S. PATENT DOCUMENTS

| | | | | |
|---|---|---|---|---|
| 6,145,117 A * | 11/2000 | Eng | ............. | G06F 17/5045 716/105 |
| 6,249,902 B1 * | 6/2001 | Igusa | ............. | G06F 17/5072 716/123 |
| 2004/0040007 A1 * | 2/2004 | Harn | ............. | G06F 17/5077 716/122 |
| 2004/0230919 A1 * | 11/2004 | Balasubramanian | | G06F 17/5045 716/104 |
| 2005/0073316 A1 * | 4/2005 | Graham | ............. | G01R 23/20 324/500 |
| 2005/0268258 A1 * | 12/2005 | Decker | ............. | G06F 17/5081 716/104 |
| 2009/0031277 A1 * | 1/2009 | McElvain | ............. | G06F 17/5072 716/104 |

* cited by examiner

*Primary Examiner* — Paul Dinh

(57) ABSTRACT

On-chip data transport network architectural units are assigned preferred placement locations based on architecture-level constraints. The preferred placement locations are used to generate placement constraints for a place and route tool. The placement constraints are applied to cells that are synthesized from each architectural unit. Constraints are blockages, fences, regions, and guides. Preferred placement locations are mapped to grid elements. Each grid elements defines a cell placement constraint.

9 Claims, 5 Drawing Sheets

AUTOMATIC ARCHITECTURE PLACEMENT GUIDANCE

FIELD OF THE INVENTION

The invention is in the field of semiconductor chip design, and in particular, logic place and route of architectural units on a semiconductor.

BACKGROUND

The process of designing chips involves many steps. Near the beginning of the process is a step of defining an overall chip architecture. That involves definition of units, with specific functions, that perform the desired functions of the chip. Some types of functions are processing, interfacing to other chips, and transporting information within the chip. All such functions are interesting, but particularly the functions for transporting information within the chip. Those are interesting because they require long connections across the floorplan of the chip.

A later step in the process of design chips is place and route (P&R). P&R is a slow step. It is done by software tools that, within the floorplan, piece together the logic and storage cells that make up a chip design. The software tools that do P&R take as input a floorplan description file and a netlist that describes the required connections between cell instances and their function. The P&R tool finds a unique placement location for each cell based on their sizes and connectivity. Placement has a goal of minimizing the total length of wires needed to make all cell connections within the chip, which generally eases the routing of wires between cells. The P&R tool also calculates and considers the logic gate switching delay along paths between flops as well as the signal propagation delay between flops, and adjusts placement in an attempt to ensure that no delay exceeds the target clock period of the flops operation.

Most P&R tools operate iteratively. That is, they make incremental changes, and calculate the resulting wire length effect, timing delay, and other design characteristics. The best P&R tools today are quadratic or linear placers. Such placers solve the equivalent of a spring problem. That is, where connection points would settle if all connections were springs. A change in the placement of any one cell affects the wire length and delay of many other cells. Modern chips have many millions of cells. Even on very fast computers, the P&R process takes a very long time. The duration of P&R for a chip is significantly longer if the timing constraints are tight, and even worse so if the starting point initial placement, before incremental changes, is uncoordinated. A better initial starting point saves a lot of time in computing a solution that meets constraints and conforms to design rules.

A problem for conventional P&R tools is how to create an initial placement that will minimize the number of incremental changes needed to achieve a successful design that meets timing constraints while minimizing wire length. Conventional P&R tools do not use information about the overall chip architecture. These tools place a netlist of cell instances without regard for the architectural functionality that a synthesis tool used to create the P&R input netlist.

A further problem with conventional P&R tools is that they primarily optimize placement in order to minimize wire length. Timing calculations of the effect of incremental placement changes are more complex and take longer than wire length calculations. Therefore, to achieve a result in a shorter amount of time, P&R tools put more effort into placement, and might achieve placement results that are unfavorable to timing. When the target speed is high, the later steps in the design process, such as post-placement routing, clock tree insertion, and power net insertion, might result in a design that cannot meet timing requirements if the placer moves cells to unfavorable positions.

Timing problems in large chips occur between clocked registers. Distance between these registers has minimum time of flight defined by the wire characteristics and buffering. Since wires are composed of metal, and metal has resistance, optimal delay across a large span has to be minimized using periodic buffer insertion. Optimal buffer placement across a wire path between two clocked registers defines the minimum time a signal can travel between them. By deduction, placement distance between registers limits performance. Timing paths optimized by Place and Route occur between registers only. Hence, these systems ability to move registers and optimize their placement is limited.

SUMMARY OF THE INVENTION

The invention is directed to using the overall chip architecture to achieve better P&R results. An aspect of the invention is using the chip architecture to guide P&R to an optimal placement of the logic gates of architectural units by restricting the placement of certain logic related to certain units of the architecture. This involves identifying the connectivity of the architectural units and identifying a preferred location of each architectural unit within the floorplan. The architectural placement is computed so that preferred locations satisfy system-level constraints and meet physical design goals. Some such constraints are wire length, data transfer bandwidth, timing path delay and power.

The preferred locations are specified as region elements that bound parts of the logic to a fenced in area or to a starting point for P&R. According to an aspect of the invention, constraints guide the P&R tool and control its placement of the cells that implement the architectural units within the physical implementation of the chip.

Some embodiments of the invention generate a grid and overlay it on the chip floorplan. The grid comprises grid elements covering at least some significant part of the chip floorplan. Grid elements may be square, or even just rectangular. In some embodiments, grid elements are irregular rectilinear shapes. Some embodiments of the invention assign each architectural unit to a grid element. It is not necessary to assign all architectural elements to grid elements, just that a significant portion of architecture elements are assigned in order to converge results in P&R.

The invention is of particular value in the placement of the logic of the units of a network-on-chip or any type of on-chip data transport network. This is true, in part because such networks span long physical distances within a chip and therefore have particularly long amounts of signal propagation delay along wires. Furthermore, the invention is of particular applicability to such networks because they are modular and design as numerous instances of units connected by standard interfaces.

DETAILED DESCRIPTION

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Accordingly, elements or features of the invention described herein as coupled have an effectual relationship realizable by a direct connection or indirectly with one or more other intervening elements.

Any methods and materials similar or equivalent to those described herein can also be used in the practice of the invention. Representative illustrative methods and materials are also described, but are not intended to limit the scope of the invention, which is defined by the claims that follow.

One aspect of the disclosed invention is an improvement to timing convergence in P&R from architectural design, through RTL, and to cell level placement for data transport network among multiple IP blocks. The invention, takes, as input, an architectural network definition. The network comprises units, described as RTL or a netlist, derived from the architectural units and their connections. Units include endpoints as well as interconnecting units such as switches, links or wires. Another input is the placement, within a floorplan, of units. In some embodiments, not all units have their placements defined.

Figure 1:
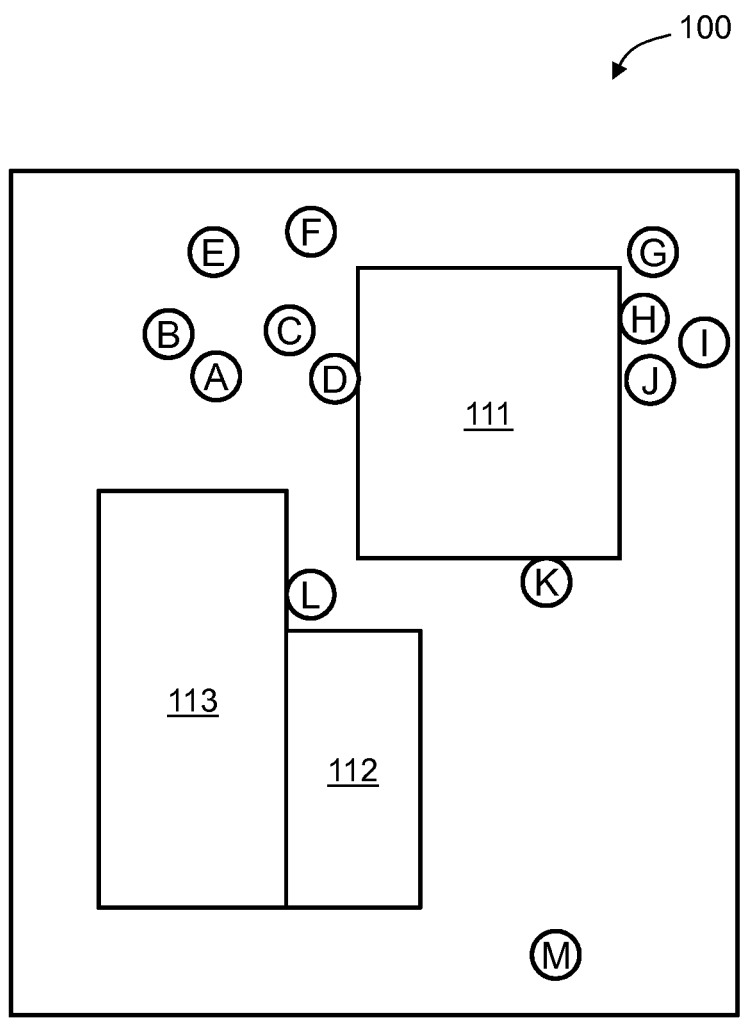
FIG. 1 illustrates a floorplan with blockages and unit placements in accordance with the invention.

FIG. 1 shows a chip floorplan 100. It has placement blockages 111, 112, and 113. The design has thirteen architectural units, A through M. According to the invention, each has a defined preferred location. The floorplan shows the preferred location of each architectural unit. The preferred location is determined in order to control latency, support a frequency of operation, minimize power consumption, minimize area, in support of other considerations, or in support of any combination of considerations.

Figure 2:
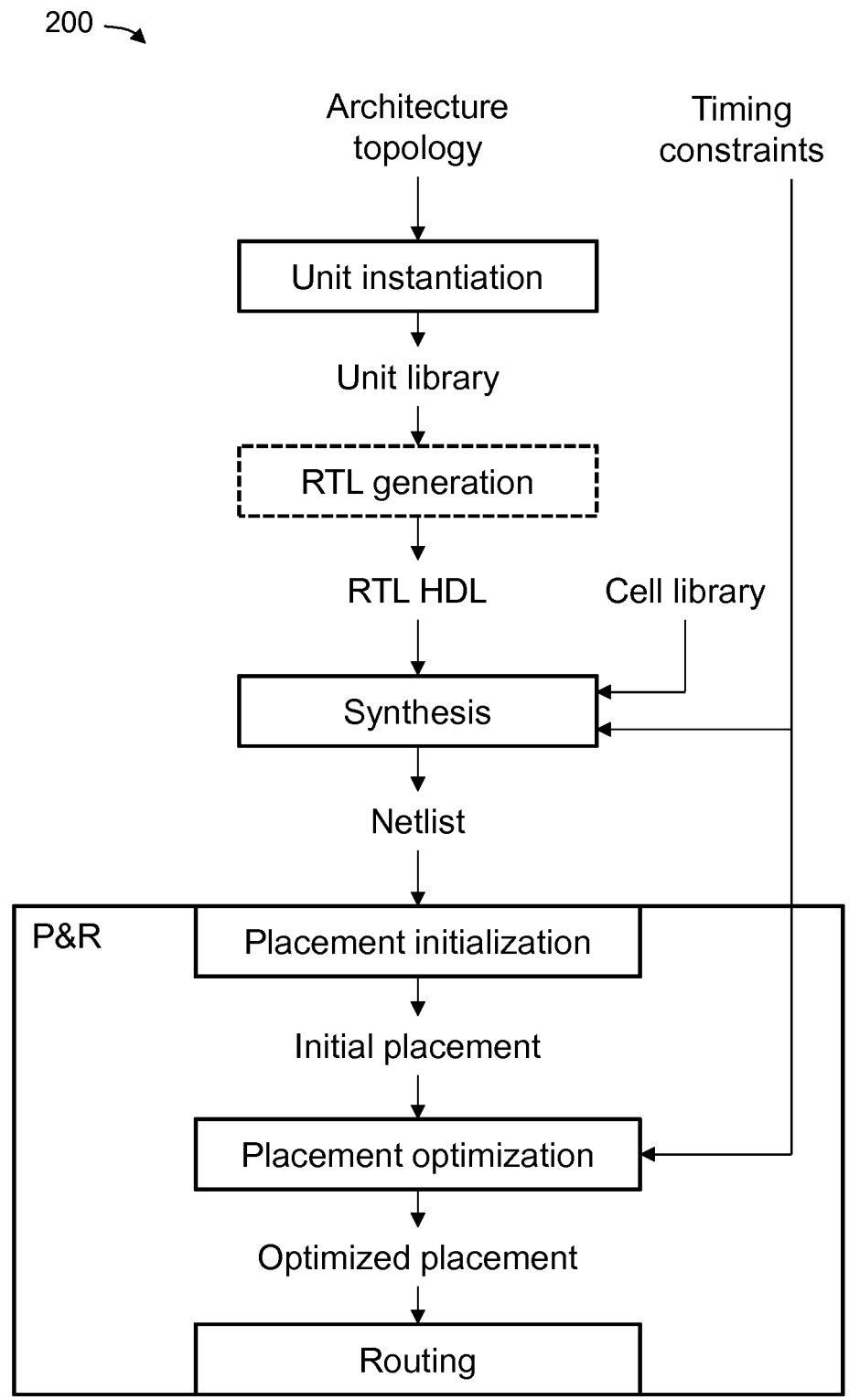
FIG. 2 illustrates a chip design flow in accordance with the invention.

FIG. 2 shows a chart for a chip design flow 200. An early step uses the definition of an architecture topology to perform unit instantiation. Unit instantiation includes defining the presence and the connectivity between architectural units. In some embodiments, the units are instantiated as register transfer language (RTL) hardware description language (HDL) code. According to the embodiment shown in FIG. 2, the unit instantiation define a parameter-based configuration of instances of units in a library. The library unit instantiations go through a process of RTL generation, which outputs HDL modeling the function of each unit. A synthesis software tool processes the HDL unit descriptions and creates a functionally equivalent netlist of cells from a cell library. The synthesis does so with respect to a set of timing constraints and other constraints. The netlist and timing constraints are inputs to the P&R process.

The P&R process first involves a step of creating an initial placement of each cell in the netlist within the chip floorplan. The placer does the initial placement with respect to a goal of minimizing the total length of wires connecting cells in the netlist. Beginning from the initial placement, and proceeding iteratively, the P&R placer moves cells within the floorplan in order to optimize their relative locations in order to meet a set of timing constraints. After it meets the timing constraints, P&R proceeds to a step of routing wires to make the necessary connections between the cells in the netlist.

Each iteration tends to be longer for each number of cell connections that do not meet the timing constraint. Furthermore, more iterations are required for each number of cell connections that do not meet the timing constraint. If a constraint is too aggressive, P&R will never achieve it. For an achievable optimized placement, an initial placement that provides a better starting point reduces the length of time needed to achieve success. Without guidance, P&R of complex designs generates an initial placement from which the iterative placement improvement process cannot evolve towards the desired goals of timing, routability, and power.

Moving a cell affects each of its connections. Accommodating moves of its connected cells affects each of its connections. As a result, each cell location movement during iterations of placement optimization can have wide-ranging effects on other cells. This, "pulling on a chain" is a slow and computationally intensive process. Making accommodations over many successive iterations can cause cells to move to places that are distant from other cells with close functional relationships.

Better quality results are achievable, and achievable with fewer iterations, by constraining locations of certain functionally related groups of cells during placement. Many design flows, represent floorplans with design exchange format (DEF) files. DEF files can contain region definitions that P&R tools will apply to groups of cells.

Figure 3:
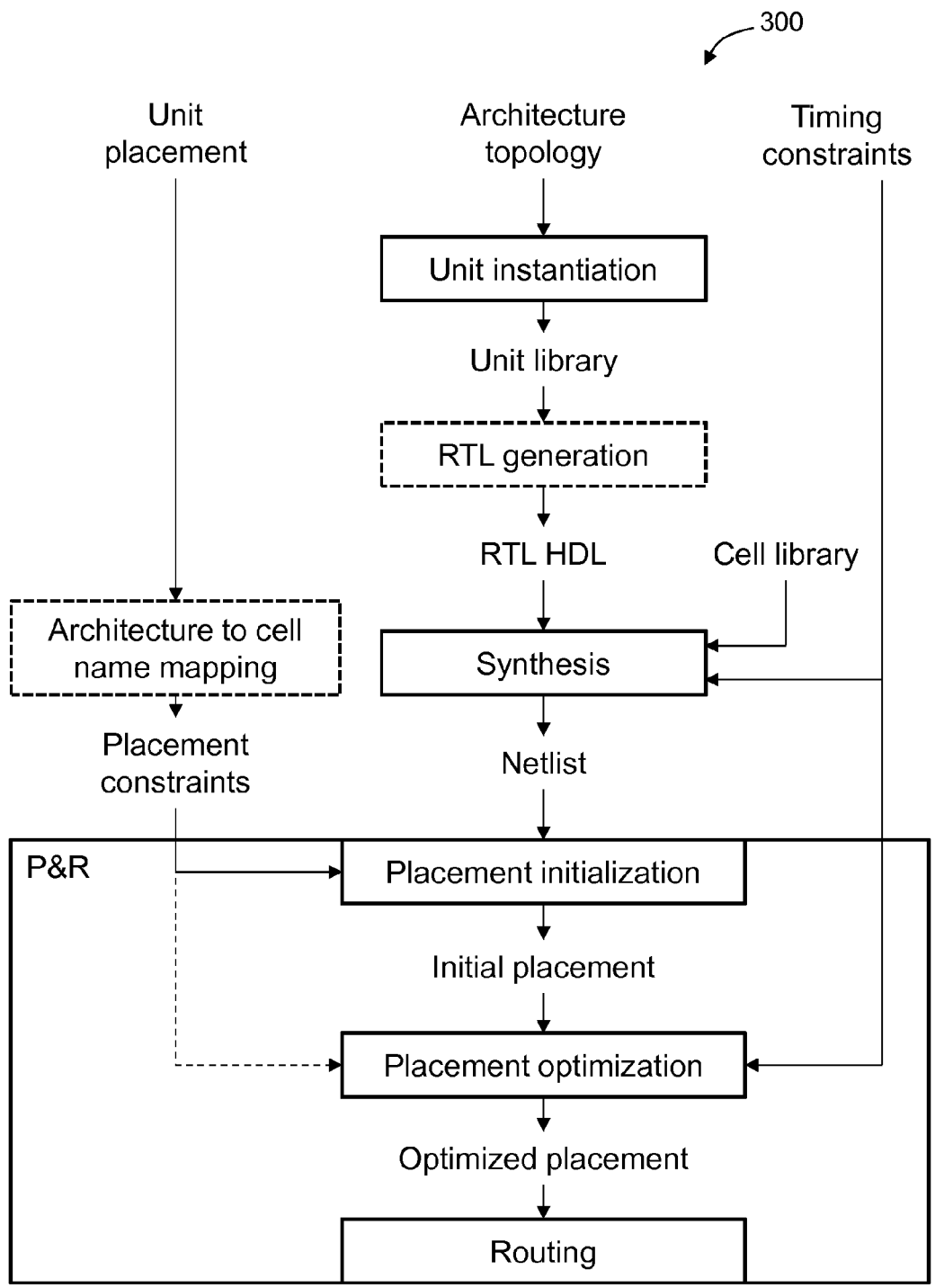
FIG. 3 illustrates a chip design flow including architecture placement guidance in accordance with the invention.

FIG. 3 shows a chart for a chip design flow 300. It is equivalent to chip design flow 200, except for the use of architectural unit placement and placement constraints as input to P&R. A unit placement is an input, along with the architecture topology. The unit placement indicates the assignment of architectural units to regions of the chip floorplan. This is at an early stage of the chip design process. It is efficient to do unit placement as early as possible in the design process since the physical placement of units affects what topology is optimal. Making those definitions together at the beginning avoids a need to return to the beginning later in the design process. Considerations used to assign architectural units to regions can include congestion, utilization, power regions, and other considerations.

Some embodiments directly use unit placement definitions as placement constraints to P&R. The embodiment of FIG. 3 includes a step of mapping the names of architecture units to the names of cells in the synthesized netlist in order to preserve the binding of architectural units to groups of synthesized cells. This step requires that the synthesis tool preserve at least some of the names of its input HDL when assigning names to the cell instances of the netlist.

Some embodiments include configuration software that generates the HDL from a unit library. Such embodiments generate the placement constraints automatically. Automatic generation is faster and more precise than is possible using an approach in which a designer manual defines placement constraints. Some embodiments require a designer to specify certain unit placement locations. Other embodiments generate the placement constraints automatically from the architecture topology given a defined set of network endpoint locations.

P&R uses the placement constraints for placement initialization. To do so, it first places the cells that are constrained by each constraint either within or outside of the area defined by the constraint. After that, placement initialization places unconstrained cells at relative locations that are likely to minimize placement optimization effort and are closer to the final timing, routability, and power goals In some embodiments, the placement optimization step also uses the placement constraints. Its movement of cell locations during iterative steps restricts the destination location of constrained cells to be within or outside of the region specified by the constraint.

Placement constraints can be hard or soft constraints. The DEF file format defines blockages as floorplan areas that exclude all cell placement. The DEF file format defines fences as floorplan areas that include all constrained cells and exclude all other cells. DEF format defines regions as floorplan areas that include all constrained cells and allows for the inclusion of other cells. DEF file format defines guides as floorplan areas in which the placement of constrained cells is probably beneficial, though the requirement is soft. Placement optimization may violate the constraints by moving cells outside the initial target area, or allowing other cells into the area.

The number of architectural units in each grid element, the type of each architectural unit, or the size of all architectural units assigned to a grid element determines the kind of DEF file constraint. Regions are most commonly used, but fences are useful where placement control needs to be particularly tight. Guides are best for grid elements with many units or high congestion. This allows cells to migrate away from the region during placement optimization, but requires the cells to start within the region during placement initialization.

Aside from constraints defined in a DEF file format, specific commands to the P&R tool are able to define constraints. The command for Synopsys P&R tools is create_bounds, using the -coordinate argument. For example, create_bounds -coordinate {4400.000 2000.000 5600.000 3300.000}-name PipeName -type soft [get_cells Pipe Name/*]

It will be apparent to those having ordinary skill in the art that floorplan file formats other than DEF are equivalents of elements of specific embodiments described herein. Furthermore, it will be apparent to those having ordinary skill in the art that other tools from Synopsys and tools from other vendors are equivalents of elements of specific embodiments described herein.

P&R works to minimize total wire length and to optimize timing between registers. Optimization across pipe stages only happens sometimes as an accidental side effect of minimizing wire length and timing optimization on logic. Placement does not take into account architectural pipelining. By giving architectural guidance, according to the invention, the P&R tool effectively has vision into the architecture pipelining.

Architectural region constraints provide flexibility to the P&R placement step to optimize congestion and timing at a local level. Architectural placement is concerned with register boundary placement for the on-chip data transport network, not cell level placement. Network-on-chip (NoC) is a commonly used type of on-chip data transport network. Since the on-chip data transport network spans distant parts of the die, in contrast to well-constrained localized blocks, guidance and control are required to achieve timing convergence and optimal latency results.

Figure 4:
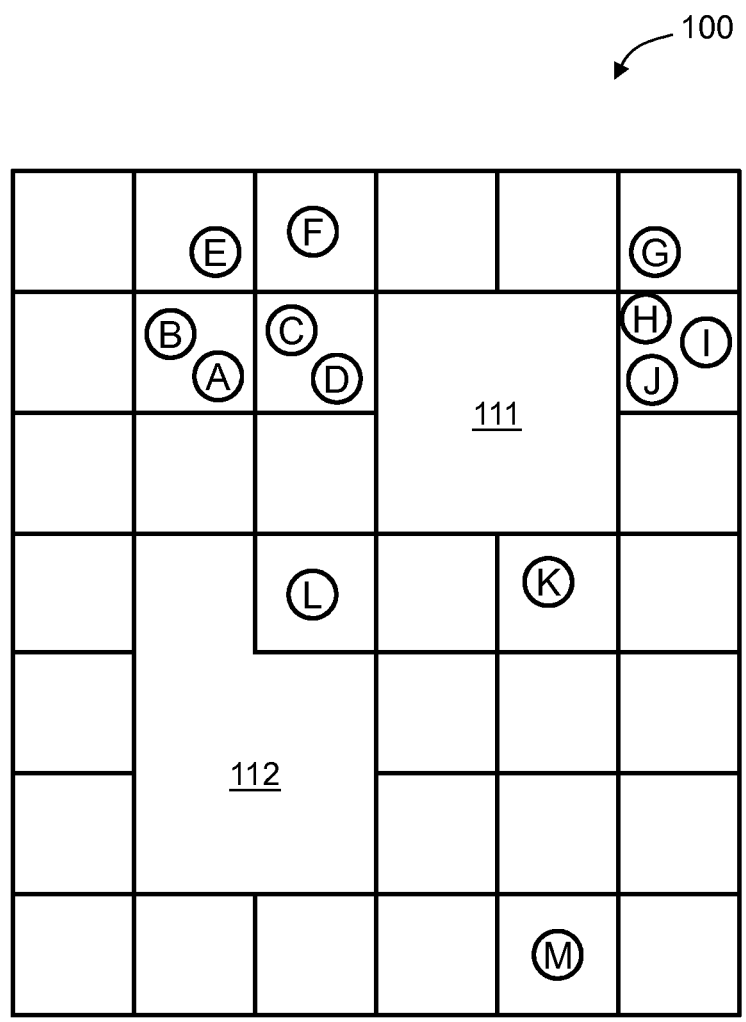
FIG. 4 illustrates a floorplan with a grid and network-on-chip units in accordance with the invention.

FIG. 4 shows an embodiment of the invention that uses a grid of rectangular grid elements, overlaying floorplan 100, to constrain architectural units. Each architectural units A-M is associated with the grid element that it overlays. A generated DEF file defines a region for at least each grid element that surrounds the location of an architectural unit. Each logic cell synthesized for an architectural unit is constrained by the DEF region to which the architectural unit is associated. The grid element dimensions determine the region coordinates. The embodiment of FIG. 4 has blockages 111 and 112. The DEF file similarly specifies these as fences. The unit placement generates a database of placement constraints, and uses that to create the DEF file. Other embodiments export a script that uses commands specific to the P&R tool. The P&R tool takes RTL or a gate netlist or both from architectural units and combines them with physical library cells and constraints to build the initial placement and perform placement optimization.

In the embodiment of FIG. 4, all grid elements are equally sized rectangles, but in other embodiments, grid elements are points, polygons, or amoebas. In other embodiments, grid elements are of varying size and shape. Grid element size is typically between 1.2 mm in big and 400 um in small current process technologies. The distance between the pipe stage registers present between architectural units dictates the appropriate grid element size. Target clock period requirements and signal propagation speed dictate the maximum allowable distance of pipe stage registers. Due to Moore's Law process scaling, typical grid element size, as used by the invention, will probably be smaller in the future. In some embodiments, a tool user specifies the size of grid element. In other embodiments, the tool automatically calculates the size of grid elements.

Figure 5:
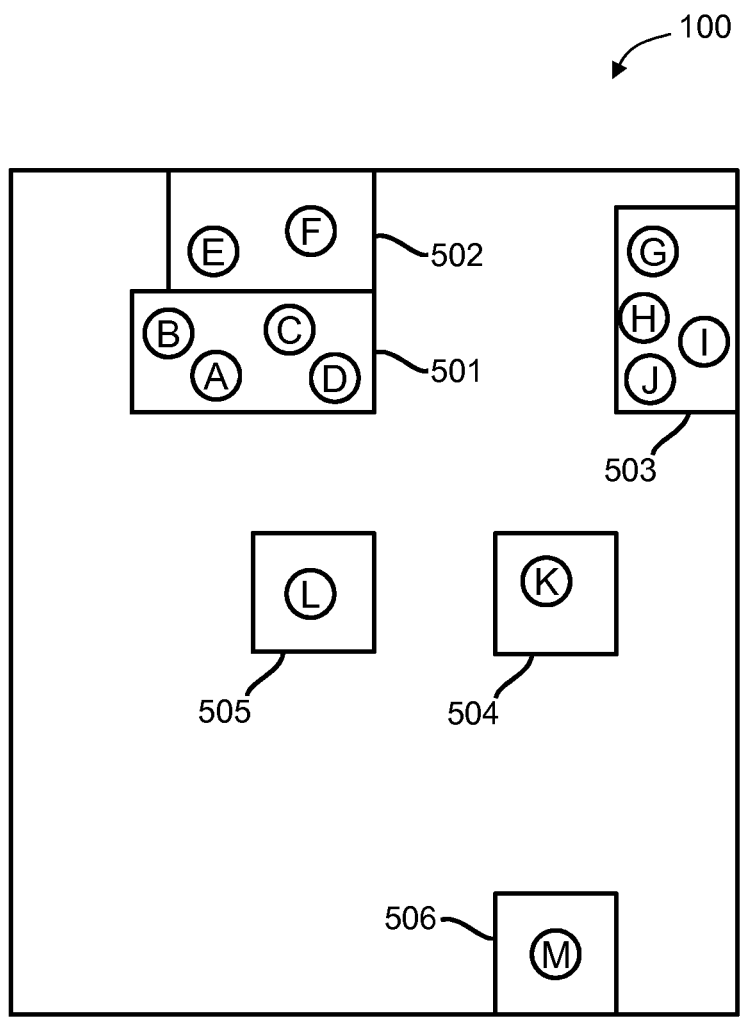
FIG. 5 illustrates irregular, bottom-up, region generation in accordance with the invention.

FIG. 5 shows an embodiment of the invention that uses bottom up generation of grid elements. In the embodiment shown, grid elements are of variable size, though in other embodiments sizes of grid elements are constant. This embodiment treats units A, B, C, and D as a group, and assigns them to region 501. Units E and F are grouped and assigned to region 502 and units G, H, I, and J are grouped and assigned to region 503. This embodiment treats unit K individually and assigns it to region 504. Likewise, unit L is assigned to region 505 and unit M is assigned to region 506. In the embodiment of FIG. 5, regions are non-overlapping, but other embodiments allow overlapping regions.

In some embodiments, an on-chip data transport network architecture has a topology comprising routers with north, south, east, west, and local connections or some subset of such connections. The topology may be a mesh, a sparse or depleted mesh, a ring, a torus, a tree, or any other type of topology. Routers may have a minimum or maximum allowed spacing or both. Such embodiments define the grid elements based on the allowed spacing between routers, such that each grid element contains no more than one router. With this approach, the router logic placement can be constrained to, at least approximately, match a user-specified or tool-generated floorplan placement of the data transport network logic.

Some embodiments include a further step of automatic pipe stage insertion. This step generally occurs between unit instantiation and synthesis. Automatic pipe stage insertion uses the unit placement and connectivity of architectural units to estimate which connections within the architecture topology will have signal delay that exceeds the clock period. That calculation uses the distance spanned by each link between architectural units. The insertion of pipe stages creates registers that break long timing paths between units. Having such pipe stages gives the placer more freedom to determine optimal placement of cells.

The invention effectively takes the step of P&R register-to-register, input-to-register, and register-to-output timing convergence from the conventional cell level to the data transport network level where placement and timing is done pipe stage-to-pipe stage, endpoint-to-pipe stage, and pipe stage-to-endpoint.

Physical machines, such as semiconductor chips; hardware description language representations of the logical or functional behavior of machines according to the invention described and claimed; and one or more non-transitory computer readable media arranged to store such hardware description language representations all can embody machines described and claimed herein.

Some embodiments of physical machines described and claimed herein are programmable in numerous variables, combinations of which provide essentially an infinite variety of operating behaviors. Some embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the invention described and claimed.

The behavior of either or a combination of humans and machines; instructions that, if executed by one or more computers, would cause the one or more computers to perform methods according to the invention described and claimed; and one or more non-transitory computer readable media arranged to store such instructions embody methods described and claimed herein. Each of more than one non-transitory computer readable medium needed to practice the invention described and claimed herein alone embodies the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, therefore, is not intended to be limited to the various aspects and embodiments discussed and described herein. Rather, the scope and spirit of invention is embodied by the appended claims.

What is claimed is:

1. A method of constraining placement of IP within a chip floorplan, the method comprising the steps:
 synthesizing a plurality of units to generate a netlist, wherein the netlist represents the plurality of units to be placed within the chip floorplan and wherein each unit includes at least one cell;
 defining a plurality of regions, wherein each region is a location for placement of at least one unit selected from the plurality of units;

determining an initial location, within a region selected from the plurality of regions, for at least one unit selected from the plurality of units;
generating at least one constraint to control the placement of the at least one unit;
passing the at least one constraint to a place and route tool; and
determining, using the place and route tool, a preferred location for at least one cell of the at least one unit within the region selected from the plurality of regions, based on the at least one constraint,
whereby the place and route tool determines the preferred location for the at least one cell of the at least one unit, such that the preferred location is within the region selected from the plurality of regions and meets the at least one constraint and optimizes the total length of wires connecting the cells of the plurality of units to the cells of other units of the netlist between the plurality of units,
wherein the preferred location and the optimized routing between the plurality of cells of the plurality of units can be used to create a physical design suitable for the manufacturing of a semiconductor device.

2. The method of claim 1 wherein the plurality of units are components of an on-chip data transport network.

3. The method of claim 1 wherein the plurality of units are components of a network-on-chip.

4. The method of claim 1 further comprising determining a set of grid elements that are part of a grid overlaid on the chip floorplan, wherein the preferred location is one grid element selected from the set of grid elements and the at least one constraint is specific to the one grid element.

5. The method of claim 1 wherein the at least one constraint is a distance between the plurality of units.

6. The method of claim 1 wherein the at least one constraint is a data transfer bandwidth.

7. The method of claim 1 wherein the at least one constraint is a timing path delay.

8. A method of constraining placement of IP within a chip floorplan, the method comprising the steps:
synthesizing a plurality of units to generate a netlist, wherein the netlist represents the plurality of units to be placed within the chip floorplan and wherein each unit includes at least one cell;
defining a plurality of regions, wherein each region is a location for placement of at least one unit selected from the plurality of units;
determining an initial location, within a region selected from the plurality of regions, for at least one unit selected from the plurality of units;
generating at least one constraint to control the placement of the at least one unit;
passing the at least one constraint to a place and route tool; and
determining, using the place and route tool, a preferred location for at least one cell of the at least one unit within the region selected from the plurality of regions, based on the at least one constraint,
whereby the place and route tool determines the preferred location for the at least one cell of the at least one unit, such that the preferred location is within the region selected from the plurality of regions and meets the at least one constraint and optimizes the total length of wires connecting the cells of the plurality of units to the cells of other units of the netlist between the plurality of units,
wherein the constraining placement of IP within the chip floorplan is implemented in fabricating semiconductor devices.

9. A method of constraining placement of IP within a chip floorplan, the method comprising the steps:
synthesizing a plurality of units to generate a netlist, wherein the netlist represents the plurality of units to be placed within the chip floorplan and wherein each unit includes at least one cell;
defining a plurality of regions, wherein each region is a location for placement of at least one unit selected from the plurality of units;
determining an initial location, within a region selected from the plurality of regions, for at least one unit selected from the plurality of units;
generating at least one constraint to control the placement of the at least one unit;
passing the at least one constraint to a place and route tool; and
determining, using the place and route tool, a preferred location for at least one cell of the at least one unit within the region selected from the plurality of regions, based on the at least one constraint,
whereby the place and route tool determines the preferred location for the at least one cell of the at least one unit, such that the preferred location is within the region selected from the plurality of regions and meets the at least one constraint and optimizes the total length of wires connecting the cells of the plurality of units to the cells of other units of the netlist between the plurality of units,
wherein the constraining placement of IP within the chip floor plan is implemented in manufacturing the chip.

* * * * *